United States Patent [19]
Reiff et al.

[11] 3,920,598
[45] Nov. 18, 1975

[54] NON-IONIC POLYURETHANE DISPERSIONS HAVING SIDE CHAINS OF POLYOXYETHYLENE

[75] Inventors: Helmut Reiff; Jurgen Lienert, both of Cologne; Roland Nast; Harro Witt, both of Dormagen-Hackenbroich; Pramod Gupta, Bedburg-Erft, all of Germany

[73] Assignee: Bayer Aktiengesellschaft, Germany

[22] Filed: Mar. 18, 1974

[21] Appl. No.: 452,180

[30] Foreign Application Priority Data
Mar. 23, 1973  Germany............................ 2314513

[52] U.S. Cl. 260/29.2 TN; 260/75 NR; 260/75 NT; 260/77.5 AQ
[51] Int. Cl.²........................................ C08G 18/76
[58] Field of Search.............................. 260/29.2 TN

[56] References Cited
UNITED STATES PATENTS
2,835,653   5/1968   Haas et al.................... 260/29.2 TN
3,479,310   11/1969  Dieterich et al............. 260/29.2 TN
3,666,542   5/1972   Kigane et al. ............... 260/29.2 TN
3,730,927   5/1973   Schloss........................ 260/29.2 TN
3,769,318   10/1973  Windemuth et al........... 260/2.5 AT
3,796,678   3/1974   Bartizal ....................... 260/29.2 TN FOREIGN PATENTS OR APPLICATIONS
2,141,805   2/1972   Germany
2,141,807   2/1972   Germany
919,329     1/1973   Canada........................ 260/29.2 TN Primary Examiner—Murray Tillman
Assistant Examiner—A. Koeckert
Attorney, Agent, or Firm—Joseph C. Gil

[57]  ABSTRACT

A polyurethane which is adapted to be dispersed in water without an emulsifier is prepared by reacting an organic compound having reactive hydrogen atoms determinable by the Zerewitinoff method with an organic diisocyanate having a side chain which contains repeating-($O-CH_2-CH_2$)-groups. Latices prepared from the polyurethane may be used to prepare films and coatings having improved physical properties.

7 Claims, No Drawings

NON-IONIC POLYURETHANE DISPERSIONS HAVING SIDE CHAINS OF POLYOXYETHYLENE

This invention relates generally to polyurethanes and more particularly to polyurethanes adapted for making dispersions without an emulsifier, to a method for making the polyurethanes and to dispersions prepared with the polyurethanes.

It has been disclosed before that polyurethanes and polyurethane ureas can be emulsified in water by using high shearing forces and emulsifiers to form latices (e.g. U.S. Pat. No. 3,294,724). It has been found, however, that the preparation of these latices is difficult and requires close technical control of the process. Moreover, the resulting products have the serious disadvantage that films produced therefrom have a poor resistance to water and the particle size of the polyurethane is such that the latices may undergo irreversible sedimentation in storage.

Polyurethane ionomers which contain internal dispersing agents in the form of ionic groups built into them do not have these disadvantages and form very finely divided stable dispersions without added emulsifiers. These known latices (see for example U.S. Pat. No. 3,479,310 or British Pat. Specification No. 1,076,688) combine two main advantages. They have the excellent properties of linear polyurethane elastomers, such as high elasticity, high tensile strength, high resistance to hydrolysis and weathering and good fastness to light, and are adapted to be worked up from solventfree media. Hence, the risk of a fire or explosion is avoided and it is not necessary to destroy or recover organic solvents which are harmful to the health and environment. The use of a solvent-free system also offers the advantages of working at a high solids content.

Although these disclosed dispersions prepared without an emulsifier have become commercially important, they have two disadvantages which have prevented their universal acceptance. They are sensitive to electrolytes and to cold temperatures.

Other dispersions which have been disclosed, e.g. in German Offenlegungsschrift Nos. 2,141,805 and 2,141,807, owe their dispersibility not to groups of an ionic nature but to centers which make use of the hydrophilic characteristics of polyethylene oxide ethers. These dispersions, insofar as they do not contain dispersing groups of an ionic nature, are prepared by reacting a trifunctional isocyanate prepolymer (e.g. made from a trifunctional polypropylene oxide polyether and the stoichiometrically required quantity of a disiocyanate) with alcohol mixtures which contain monofunctional polyethylene oxide ethers, the reactants being used in such proportions that the reaction mixture contains one mol of isocyanate prepolymer to one mol of the mixture of monofunctional alcohols. The resulting mixture which contains NCO groups is dispersed in water under the action of a shearing force and undergoes an increase in molecular weight as a result of the known reactions of NCO groups with difunctional compounds (e.g. diamines). According to the examples given in German Offenlegungsschrift No. 2,141,805 and in Example 4 of German Offenlegungsschrift No. 2,141,807, structures in the form of films obtained from these dispersions have ε-moduli of about 5 kg.wt/cm² or tensile strengths of about 10 kg.wt./cm² at elongations at break of 200%. Such dispersions are unsuitable for making coatings or coverings which have high mechanical resistance because such coatings are required to have a minimum tensile strength of 150 kg.wt./cm² and a minimum elongation at break of about 400%.

It is therefore an object of this invention to provide a method of preparing novel polyurethanes which can be dispersed in water without the aid of dispersing agents and of preparing dispersions from these polyurethanes, which are devoid of the above disadvantages. Another object of the invention is to provide novel polyurethane latices adapted for use in making coatings having improved physical properties. Still another object of the invention is to provide a novel polyurethane adapted to be dispersed in water without an added emulsifier.

The foregoing objects and others are accomplished in accordance with this invention by providing a process for the preparation of non-ionic, aqueous polyurethane dispersions which are free from emulsifiers wherein a difunctional organic compound having a molecular weight within the range of about 500 to about 6000 and containing terminal groups having hydrogen atoms capable of reacting with isocyanate groups is reacted with an organic diisocyanate or a mixture of organic diisocyanates which contain from 5 to 100 mol percent of a diisocyanate having polyethylene oxide units. The reaction mixture may optionally contain a conventional chain-lengthening agent having a molecular weight below 500 commonly used in polyurethane chemistry and the usual auxiliary agents and additives used in polyurethane chemistry. The polyurethane provided by the invention may be prepared either under substantially anhydrous conditions and the resulting polyurethane converted later into an aqueous dispersion in known manner or it may be prepared in two stages by the prepolymer process in which the organic compound having reactive hydrogens and a molecular weight of about 500 to about 6000 and diisocyanate are reacted together under substantially anhydrous conditions to form a prepolymer having terminal NCO groups and in a second stage, the prepolymer is chain extended in water.

Any suitable organic diisocyanate which contains polyethylene oxide units having the following formula may be used:

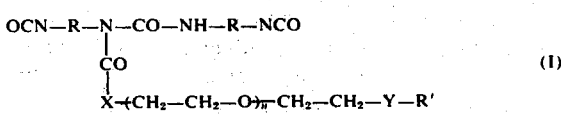

$$OCN-R-N-CO-NH-R-NCO \atop | \atop CO \atop | \atop X-(CH_2-CH_2-O)_n-CH_2-CH_2-Y-R' \quad (I)$$

in which
R represents an organic group obtained by removing the isocyanate groups from an organic diisocyanate having a molecular weight of from about 112 to about 1000,
R' represents a monovalent hydrocarbon group containing 1 to 12 carbon atoms,
X and Y are the same or different and represent oxygen or a group of the formula —N(R'')— in which R'' represents a monovalent hydrocarbon group containing 1 to 12 carbon atoms, and
n represents an integer of from 9 to 89.

The invention also provides aqueous polyurethane dispersions prepared from the novel polyurethane.

The invention also provides a process for producing thermoplastic polyurethane elastomers which have a substantially linear molecular structure and can be dispersed in water without the addition of an emulsifier wherein an organic diisocyanate is reacted with an organic compound having a molecular weight in the range of about 500 to about 6000 which is difunctional for the purpose of the isocyanate polyaddition reaction and contains terminal hydrogen atoms which are capable of reacting with isocyanate groups. Conventional chain-lengthening agents having a molecular weight below 500, auxiliary agents and additives customarily used in polyurethane chemistry may be included in the reaction mixture. Any suitable organic diisocyanate having ethylene oxide units of the following general formula may be used:

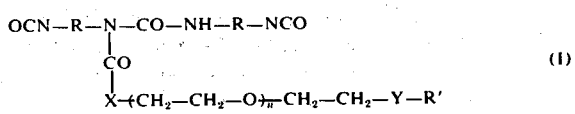

in which
R represents an organic group such as can be obtained by removing the isocyanate groups from an organic diisocyanate having a molecular weight of from about 112 to about 1000,
R' represents a monovalent hydrocarbon group containing 1 to 12 carbon atoms,
X and Y are identical or different and represent oxygen or a group of the formula —N(R")— in which R" represents a monovalent hydrocarbon group containing 1 to 12 carbon atoms and
n represents an integer of from 9 to 89.

The polyisocyanate of the above formula may be used in a mixture with a diisocyanate of the general formula $R(NCO)_2$ which does not contain polyethylene oxide units and wherein R is an aliphatic, cycloaliphatic or aromatic radical, hereinafter "unmodified diisocyanates".

This invention also provides polyurethanes prepared by the novel process.

The preparation of a polyurethane which can be dispersed in water without the aid of dispersing agents is carried out by the known methods of polyurethane chemistry and involves reacting a difunctional organic compound containing terminal groups which are reactive with isocyanate groups and having a molecular weight of from about 500 to about 600, preferably about 600 to about 3000, with an organic diisocyanate. A conventional chain-lenthening agent which is difunctional and has a molecular weight of below 500 may be included in the reaction mixture, if desired. It is an essential feature of the invention, however, that the organic diisocyanate used in the process of the invention be at least partially one of the compounds of the general formula

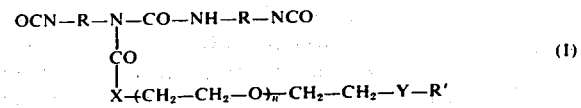

in which R, R', X, Y and n have the meanings already indicated above.

These special diisocyanates which are essential to the invention are preferably used as mixtures with unmodified diisocyanates of the general formula $R(NCO)_2$, the diisocyanate mixtures contain from about 5 to about 100 mol percent, preferably about 10 to about 50 mol percent of the essential modified diisocyanates of the above formula I.

Any organic compound containing groups having hydrogen atoms determinable by the Zerewitinoff method and reactive with an isocyanato group having a molecular weight of from about 500 to about 6000, preferably about 600 to about 3000, which is difunctional for the purpose of the isocyanaate polyaddition reaction may be used, such as, for example dihydroxy polyesters, polyactones, poly (alkylene ether) glycols, polycarbonates, poly (alkylene thioether) glycols, polyacetals and polyetheresters.

Suitable dihydroxypolyesters are those disclosed heretofore in polyurethane chemistry which are prepared by esterification of dicarboxylic acids such as succinic acid, adipic acid, suberic acid, azelaic acid, sebacic acid, phthalic acid, isophthalic acid, terephthalic acid or tetrahydrophthalic acid, and the like, and diols such as ethylene glycol, propylene-1,2-glycol, propylene-1,3-glycol, diethylene glycol, butane-1,4-diol, hexane-1,6-diol, octane-1,8-diol, neopentyl glycol, 2-methylpropane-1,3-diol or the various isomeric bis-hydroxymethyl-cyclohexanes and the like.

Any suitable polylactone known per se in polyurethane chemistry may be used such as, for example, polymers of ε-caprolactone which have been initiated on one of the abovementioned glycols.

Any suitable polycarbonate known per se in polyurethane chemistry which can be obtained, for example, by reacting the above-mentioned diols with diaryl carbonates or phosgene may be used.

Any suitable polyether known per se in polyurethane chemistry such as, for example, polymers or copolymers of styrene oxide, propylene oxide, tetrahydrofuran, butylene oxide or epichlorohydrin which can be prepared using divalent starter molecules such as water, the above-mentioned diols or amines which contain 2-N-H-bonds may be used. A certain proportion of ethylene oxide may also be included but the polyether used must not contain more than about 10 percent by weight of ethylene oxide. It is preferred, however, to use polyethers which have been obtained without the use of ethylene oxide.

Any suitable polythioether, polythio mixed ether and polythioetherester known per se in polyurethane chemistry may be used.

Any suitable polyacetal known per se in polyurethane chemistry, for example, those obtained from the above-mentioned diols and formaldehyde may be used.

Any suitable difunctional polyetherester which contains terminal groups capable of reacting with isocyanate groups may be used.

Other suitable organic compounds having reactive hydrogen atoms and a molecular weight of about 500 to about 6000 are disclosed in U.S. Pat. No. 3,479,310 granted Nov. 18, 1969, the disclosure of which is incorporated herein by reference. Dihydroxypolyesters, dihydroxypolylactones and dihydroxypolycarbonates are preferred.

Any suitable chain-lengthening agent having a molecular weight below 500 including those disclosed in U.S. Pat. No. 3,479,310, may be used in the process of the invention for preparing the self-dispersible polyurethanes. For example, the low-molecular weight diols which have been described above for the preparation of the dihydroxypolyesters, or also diamines such as diaminoethane, 1,6-diaminohexane, piperazine, 2,5-dimethylpiperazine, 1-amino-aminoethyl-3,5,5-trimethylcyclohexane 4,4'-diaminodicyclohexylmethane, 1,4-diaminocyclohexane and propylene-1,2-diamine or also hydrazine, aminoacid hydrazides, hydrazides of semicarbozidocarboxylic acids, bishydrazides, bis-semicarbazides and the like may be used.

Diisocyanates of the general formula (RNCO)$_2$ which may be used in practicing the invention include all of the known diisocyanates of polyurethane chemistry including those disclosed in U.S. Pat. No. 3,479,310, the disclosure of which is incorporated herein by reference.

It is preferred to use as those diisocyanates which are free from polyethylene oxide units diisocyanates of the formula R(NCO)$_2$ wherein R is an aliphatic hydrocarbon radical containing 2 to 18 carbon atoms, a divalent cycloaliphatic hydrocarbon radical containing 4 to 15 carbon atoms, a divalent aromatic hydrocarbon radical containing 6 to 15 carbon atoms or an araliphatic hydrocarbon radical containing 7 to 15 carbon atoms. The following are typical examples of such organic diisocyanates: ethylene diisocyanate, tetramethylene diisocyanate, hexamethylene diisocyanate, dodecamethylene diisocyanate, cyclohexane-1,3-diisocyanate and cyclohexane-1,4-diisocyanate, 1-isocyanato-3-isocyanato-methyl-3,5,5-trimethylcyclohexane, 4,4'-diisocyanatodicyclohexylmethane or aromatic diisocyanates such as 2,4-diisocyanatotoluene, 2,6-diisocyanatotoluene and mixtures of these isomers, 4,4'-diisocyanatodiphenylmethane, 1,5-diisocyanatonaphthalene, and the like.

Preparation of these modified allophanate diisocyanates may be carried out, for example, by heating one mol of a monofunctional alcohol of the general formula R' — Y — CH$_2$ — CH$_2$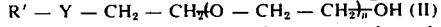O — CH$_2$ — CH$_2$)$_{\overline{n}}$OH (II)

with two mols of one of the above-mentioned diisocyanates of the general formula R(NCO)$_2$, the first stage yielding the urethane which then reacts with a second mold of diisocyanate at a higher temperature to give rise to the allophanate diisocyanate. R' and Y in formula II have the same meaning as in formula I above. If desired, trimerisation of the diisocyanate may be prevented by a method analogous to that described in U.S. Pat. No. 3,769,318 (the disclosure of which is incorporated herein by reference) by adding catalytic quantities of alkylating agents such as p-toluene sulphonic acid esters. Allophanate formation may also be accelerated in accordance with the method given in U.S. Pat. No. 3,769,318 (the disclosure of which is incorporated herein by reference) by adding certain metal compounds such as zinc acetyl acetonate. Preparation of the allophanate diisocyanates used according to the invention may be carried out, for example, as follows: 1500 g of a polyethylene oxide alcohol with a molecular weight of 2030 which has been initiated on n-butanol and 1305 g of tolylene diisocyanate are heated to 100°C for 5 hours in the presence of 0.1% of methyl p-toluene sulphonate and 0.005% of zinc acetyl acetonate. After the addition of 0.025% of benzoyl chloride, 2805 g of the solution of allophanate diisocyanate used according to the invention in tolylene diisocyanate are obtained. The NCO-content is 20.6%, the polyethylene oxide content approximately 53%.

Part of the material is freed from excess tolylene diisocyanate in a thin layer evaporated. The pure allophanate diisocyanate with NCO-content 3.6% is obtained.

The diisocyanates used in practicing the process of the invention are preferably diisocyanate mixtures consisting of the allophanate diisocyanates used according to the invention and unmodified diisocyanates of the formula R(NCO)$_2$. The mixture should contain from about 5 to about 100 mol percent and preferably from 10 to 50 mol percent of the essential modified allophanate diisocyanate containing units derived from ethylene oxide.

To prepare the biuret diisocyanates which may be used instead of the allophanate diisocyanates in the process according to the invention, a monohydric alcohol of the formula

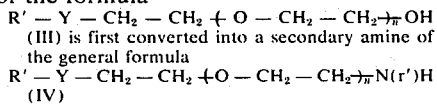

R', n and Y have the same meanings in formulas III and IV as in formula I above. This conversion of the alcohols into the corresponding secondary amines may be carried out, for example, by the known reaction with N-substituted ethylene imines or by a condensation reaction of the alcohols with primary amines in a molar ratio of between 1 : 1 and 1 : 10. If ethylene imine derivatives are used, the value for n is increased to n + 1. Conversion of the resulting secondary amines which contain polyethylene oxide units into the biuret diisocyanates which are used according to the invention is carried out by reacting one mole of the secondary amine with at least two mols of one of the above disclosed diisocyanates of the general formula R(NCO)$_2$. The reaction takes place in two stages. In the first stage, the secondary amine reacts with one mol of diisocyanate to form the urea isocyanates and this then reacts with a second mol of diisocyanate at a higher temperature to form a biuret diisocyanate. In this reaction, trimerization of the diisocyanate can be suppressed by using catalytic quantities of alkylating agents such as p-toluene sulphonic acid esters. Preparation of the biuret diisocyanates used according to the invention may be carried out, for example, as follows:

A polyethylene oxide monoalcohol with a molecular weight of 2000 which had been initiated on n-butanol is used as a starting material. Reaction of this polyethylene oxide alcohol with an excess of N-phenyl-ethylene imine (pressure vessel, 100°C to 120°C, 12 to 15 hours) followed by removal of excess N-phenyl-ethylene imine by distillation under vacuum (boiling point 13 mm Hg, 70°C to 70.5°C) yields ω-N-phenylaminopolyethylene oxide with a molecular weight of approximately 2100.

2100 g of ω-N-phenylaminopolyethylene oxide and 1740 g of tolylene diisocyanate are heated to 80°C to 90°C for 3 hours in the presence of 0.1% of methyl p-toluene sulphonate (urea formation). The reaction mixture is then heated to 165°C to 175°C until the calculated NCO-content of 19.7% is obtained. The product obtained is the solution in tolylene diisocyanate of a biuret diisocyanate used according to the invention. The ethylene oxide content is approximately 51%.

The biuret diisocyanates used according to the invention are, like the allophanate diisocyanates, used as mixtures with unmodified diisocyanates of the formula R(NCO)$_2$ above for producing the self-dispersible polyurethanes, the diisocyanate mixtures containing 5 to 100 mol percent, preferably 10 to 30 mol percent of the modified diisocyanates according to the invention. The process according to the invention may, of course, also be carried out using mixtures of allophanate and biuret diisocyanates.

The monohydric alcohols containing polyethylene oxide units which are used for preparing the modified diisocyanates are obtained in known manner by ethoxylation of monohydric alcohols or monohydric phenols of the general formula R'—OH or by ethoxylation of secondard amines of the general formula R'—NHR''. In these formulas, R' and R'' are identical or different and represent hydrocarbon groups, in particular $C_1$ to $C_{10}$ alkyl groups, $C_4$ to $C_8$ cycloalkyl groups, $C_6$ to $C_{12}$ aryl groups or $C_7$ to $C_{10}$ aralkyl groups. Any suitable alcohol or phenol may be used such as, for example, methanol, ethanol, n-propanol, n-hexanol, n-decanol, isopropanol, tertiary butanol, phenol, p-cresol, benzyl alcohol and the like. Any suitable secondary amine may be used such as, for example, dimethylamine, diethylamine, dipropylamine, N-methyl-hexylamine, N-ethyl-decylamine, N-methylaniline, N-ethyl-benzylamine, N-methyl-cyclohexylamine and the like.

The quantity of ethylene oxide which is grafted into the molecules may vary within wide limits, the polyethylene oxide chains generally consisting of about 10 to about 90 and preferably about 20 to about 70 ethylene oxide units.

Conversion of the polyethylene oxide alcohols into the corresponding secondary amines is carried out in known manner by reacting them with an N-substituted ethylene imine of the general formula

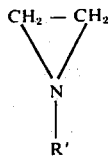

or a primary amine of the general formula R'—NH₂, in which R' has the meaning already indicated.

The process according to the invention for preparing polyurethanes which are dispersible in water is carried out by the known methods of polyurethane chemistry and involving reacting the above mentioned higher molecular weight compounds which contain groups capable of reacting with isocyanate groups with the diisocyanates or diisocyanate mixtures used according to the invention, optionally with the addition of the chain-lengthening agents mentioned above; either the one-stage process or the two-stage process may be employed (prepolymer process).

In the reaction mixtures used for preparing the self-dispersible polyurethanes, the ratio of isocyanato groups to groups which are reactive with isocyanate groups is between about 0.8 : 1 and about 2.5 : 1, preferably between about 1 : 1 and about 1.1 : 1. The given proportions do not include the water which may already be present at the stage of preparing the dispersible polyurethanes. When the dispersible polyurethanes according to the invention are prepared with an excess of NCO, the reaction products, of course, contain NCO-groups and when the polyurethanes are dispersed in water they continue to react with water to form polyurethanepolyureas which are free from NCO-groups. The modified diisocyanates which are essential to the process of the invention are used in such quantities and the quantity of polyethylene oxide units in these diisocyanates is so chosen that the finished polyurethane contains between about 3 and about 30 percent by weight, preferably about 5 to about 20 percent by weight of side chain polyethylene oxide segments.

Both the one-stage process and the two-stage process may be carried out either with or without solvents. Organic solvents may be used, especially if, as described below, the polyurethanes are intended to be converted into an aqueous dispersion during or after their preparation. Preferred solvents are miscible with water and inert towards isocyanato groups and have a boiling point below 100°C, e.g. acetone or methyl ethyl ketone.

When the one-stage process is employed, the diols mentioned above are preferably used as chain-lengthening agents. The reactants are in this case preferably mixed in the absence of solvents and reacted at temperatures of about 50°C to about 150°C. The viscosity of the mixture rises during the reaction and one of the above mentioned solvents is gradually added to the mixture as the temperature increases. An organic solvent solution of the completely reacted polyurethane is finally obtained in which the concentration of solids is preferably adjusted to about 10 to about 50 percent by weight, preferably about 15 to about 30 percent by weight. The dissolved polyurethane elastomers are then advantageously converted into an aqueous dispersion by adding water to the stirred solution. In many cases, the solution then passes through the phase of a water-in-oil emulsion but then overcomes a viscosity maximum and is at the same time converted into an oil-in-water emulsion. After removal of the solvent by distillation, a purely aqueous, stable dispersion remains behind.

When the two-stage process is employed, an NCO prepolymer is preferably first prepared in the absence of solvent or in the presence of solvent from excess diisocyanate and the higher molecular weight compound which contains hydrogen atoms capable of reacting with isocyanate groups, the NCO/OH-ratio in the reaction mixture being kept within the range of about 1.1 to about 3.5, preferably about 1.2 to about 2.2. If the NCO prepolymer has been prepared without solvent, it is then taken up with a suitable solvent. The resulting solution of prepolymer may then be reacted with the chain-lengthening agent in known manner. To prepare the polyurethane dispersions according to the invention, it is advisable to use a special variation of the two-stage process in which the chain-lengthening agent, preferably one of the above mentioned diamines or hydrazine derivatives, dissolved in a small quantity of water or a mixture of water and solvent is added to the above described solution of NCO prepolymer in such proportions that the NCO/NH-ratio is between about 2.5 and about 1.005. This reaction may be carried out at room temperature, for example, but may advantageously also be carried out at between about 25°C and about 60°C. The desired polyurethane dispersion is obtained by adding the remainder of the water and removing the solvent. In this variation of the process, the chain-lengthening agent may also be dissolved in the total quantity of water subsequently present in the dispersion (about 50 to about 200 percent by weight, based on solid polyurethane).

In principle, the polyurethane elastomers provided by the invention may also be converted into dispersions by one other method, for example, by dispersion without using solubilizing agents, e.g. by mixing the solvent-free elastomer melt with water in apparatus which is capable of producing high shearing gradients or by using very small quantities of solvents as plasticizing agents in the same apparatus or by means of non-mechanical dispersing agents such as very high-frequency sound waves. Lastly, in the case of polyurethane ureas, chain-lengthening may also be carried out after conversion of the prepolymer into an aqueous emulsion.

In all the variations of the process described above for producing the polyurethanes according to the invention and their aqueous dispersions, one essential feature is the use of exclusively difunctional structural components. According to the findings of the chemistry of high polymer latices, however, the addition of very small quantities of trifunctional low-molecular weight compounds, e.g. trifunctional isocyanates or trifunctional chain-lengthening agents, may in some cases improve the properties of the product, but the degree of branching should not be higher than about 1%.

The dispersions according to the invention have an average particle size of 0.5 m $\mu$ to 5 $\mu$, preferably about 100 - 500 m $\mu$, and obviously the optical dispersion or Tyndall effect begins to appear in dispersions with particle sizes below 500 m $\mu$.

The rheological properties of the dispersions, which will not be discussed in detail here, depend on the particle size and the concentration. The viscosity increases as the particles become smaller and, moreover, below a particle size of about 100 m $\mu$, the flow limit progressively increases (Bingham body). Quite apart from these relationships, the viscosity increases with increasing concentration which in this class of dispersions may be up to 70% so that the viscosity may reach values of 50 cP.

The dispersions are unaffected by electrolytes so that, for example, acid catalysts may be used for catalyzing the crosslinking of latex particles with formaldehyde or formaldehyde derivatives and the particles may also be pigmented with electrolytically active pigments or dyes. Another property of the dispersions according to the invention is their thermal coagulability which enables them to be worked up into foils or films which are permeable to water vapor simply by heating them.

The dispersions may be blended with other dispersions, e.g. with polyvinyl acetate, polyethylene, polystyrene, polybutadiene, polyvinyl chloride and copolymer synthetic resin dispersions.

In addition, fillers, plasticizers, pigments, carbon black, silica sols, aluminum, clay and asbestos dispersions may also be incorporated in the dispersions according to the invention.

The aqueous polyurethane dispersions are stable and are suitable for storage or shipping and can be worked up, e.g. to give shaped products, at any later date. They are generally converted directly into dimensionally stable synthetic resin coatings by drying although shaping of the products may also be carried out in the presence of cross-linking agents known per se. The polyurethanes obtained differ in their properties according to the selected chemical composition and the urethane group content so that soft, sticky compounds or thermoplastic and rubbery elastic products with varying degrees of hardness up to glasshard duroplasts can be obtained. The hydrophilic character of the products may also vary within wide limits. The elastic products can be worked up thermoplastically at elevated temperatures, for example at about 100° to about 180°C.

The products of the process are suitable for coating substrates of laminating and impregnating such as, for example, woven and non-woven textiles, leather, paper, wood, metal, ceramic, stone, concrete, bitumen, hard fiber, straw, glass, porcelain, various synthetic resins or glass fibers to produce antistatic and crease-resistant finishes and they may be used as binders for fleeces, adhesives, bonding agents, lining materials, agents to render materials hydrophobic, plasticizers, binders, etc. for corkdust or woodmeal, glass fibers, asbestos, paper-type materials, plastics or rubber waste or ceramic materials and as auxiliary agents in cloth printing and in the paper industry, as additives for polymers, as sizes, for example for glass fibers, and for finishing leather.

The dispersions or pastes used for these purposes are preferably applied to a porous support which remains bonded to the finished product such as woven or non-woven textiles or fiber mats, felts or fleeces or also paper fleeces, foam plastics, foils or split leather which by their absorbency effect immediate solidification of the coating. The products are then dried at elevated temperatures and, if necessary, are pressed. Drying may also be carried out on smooth, porous or non-porous materials such as metal, glass, paper, cardboard, ceramic materials, sheet steel, silicone rubber or aluminum foil, the finished sheeting being substantially lifted off and used as such or the product may be applied to a substrate by the reversal process, either by glueing, flame-laminating or calendering. This application by the reversal process may be carried out at any time.

The properties of the products of the process may be modified by adding vinyl polymers or active or inactive fillers, for example, polyethylene, polypropylene, polyvinyl acetate, ethylene/vinyl acetate copolymers which may be completely or partly saponified and/or grafted with vinyl chloride, styrene/butadiene copolymers, ethylene (graft) copolymers, carbon black, silica, asbestos, talcum, kaolin, titanium dioxide or glass in the form of powder or in the form of fibers, or cellulose. The end product may contain up to 70% of such fillers, based on the total quantity of dry substance, depending on the desired properties and use purposes of the end product.

Dyes, pigments, plasticizers or additives which influence the rheological properties may, of course, also be included, e.g. small amounts of additional emulsifiers or polar solvents could be used.

The products obtained by the various techniques of application may be dried at room temperature or elevated temperatures. The temperature employed in any individual case, which depends not only on the chemical composition of the material but particularly also on the moisture content, the drying time and the thickness of the layer, can easily be determined by a preliminary test. For a given heating time, the drying temperature must always be below the solidification temperature.

The sheet products may subsequently be coated with a finish to increase the resistance of their surface. Aqueous dispersions or solutions are again preferably used for this purpose.

Very hard polyurethanes obtained from finely divided dispersions and sols are suitable for use as stoving lacquers and in some cases even as air-drying lacquers. They combine the advantages of great hardness and elasticity with high gloss and, when aliphatic diisocyanates are used, they also have high fastness to light and weathering.

The following examples serve to explain the composition and preparation of the products and some of their physical properties.

PREPARATION OF ALLOPHANATE ISOCYANATES OR MIXTURES THEREOF TO BE USED IN PRACTICING THE INVENTION 1500 g of a polyethylene oxide monohydric alcohol with a molecular weight of 2030 which has been initiated on n-butanol and 1305 g of tolylene diisocyanate are heated to 100°C for 5 hours in the presence of 0.1% of methyl p-toluene sulphonate and 0.005% of zinc acetyl acetonate. 2805 g of the solution of an allophanate diisocyanate used according to the invention in tolylene diisocyanate (80% 2,4-isomer and 20% 2,6-isomer = TDI 80) are obtained after the addition of 0.025% of benzoyl chloride. The NCO value is 20% and the polyethylene oxide content approximately 53%.

Part of the material is freed from excess tolylene diisocyanate in a thin-layer evaporator. The pure allophanate diisocyanate which has an NCO-content of 3.6% is obtained.

All of the allophanate diisocyanates in the following table and their mixtures are prepared in analogous manner. The characteristic data of the allophanate diisocyanate mixtures used are summarized in the following table.

Summary of the allophanate diisocyanate mixtures used

| Allophanate diisocyanate mixture | Starting materials | Characteristic constants | |
|---|---|---|---|
| | | NCO-content | Ethylene oxide content |
| A | Ethoxylated butanol (molecular weight 2030)/ TDI 80 in a molar ratio of 1:9 | 24.8% | 42.1% |
| B | Ethoxylated butanol (molecular weight 2030)/ TDI 80 in a molar ratio of 0.75:7.5 | 20.6% | 53% |
| C | Ethoxylated butanol (molecular) weight 2030)/ TDI 80 in a molar ratio of 1:5 | 16.9% | 57% |
| D | Ethoxylated butanol (molecular weight 2030)/ TDI 80 in a molar ratio of 1:15 | 24.5% | 43.5% |
| E | Ethoxylated butanol (molecular weight 2030)/ hexamethylene diisocyanate in a molar ratio of 1:10 | 30.8% | 31.8% |

PREPARATION OF A BIURET DIISOCYANATE FOR USE ACCORDING TO THE INVENTION (BIURET DIISOCYANATE F)

A polyethylene oxide monohydric alcohol with a molecular weight of 2000 which has been initiated on n-butanol is used as the starting material. Reaction of this polyethylene oxide alcohol with an excess of N-phenylethylene imine (pressure vessel, 100° to 120°C, 12 to 15 hours) followed by removal of excess N-phenylethylene imine by distillation under vacuum (boiling point$_{13}$ 70° to 70.5°C) yields ω-N-phenylaminopolyethylene oxide, molecular weight approximately 2100.

2100 g of the ω-N-phenylaminopolyethylene oxide and 1740 g of TDI 80 are heated to 80° to 90°C in the presence of 0.1% of methyl p-toluene sulphonate for 3 hours (urea formation). The reaction mixture is then heated at 165° to 175°C until the calculated NCO-content of 19.7% is obtained. The resulting product is a solution of a biuret diisocyanate used according to the invention in tolylene diisocyanate. The ethylene oxide content is approximately 51%.

EXAMPLE 1

200 g of a polyester of adipic acid and ethylene glycol having a molecular weight of 2000 are dehydrated under vacuum at 110°C for about 30 minutes. After cooling to 70°C, 57.2 g of allophanate diisocyanate A of the foregoing Table are added and the reaction mixture is then heated to 100°C until (approximately 1 hour) the NCO-content reaches or falls just below the calculated value of 2.29%. The prepolymer is dissolved in 800 ml of acetone. A chain-lengthening solution consisting of 0.6 g of ethylene diamine, 1.6 g of hydrazine hydrate and 30 ml of water is added to the acetone solution at 50°C. This reaction mixture is then left to react for 5 minutes at 50°C. A distinct rise in viscosity is observed. After termination of the reaction, 360 ml of water are stirred into the reaction mixture and the acetone is distilled off under reduced pressure. A highly fluid dispersion which has an NCO/OH-ratio of 1.7, an NCO/NH-ratio of 1.67 and an ethylene oxide content of 9.3% is obtained. The solids content of the dispersion is 40%.

On drying, the dispersion produces a film which is distinguished by its high strength and elasticity. It can be cured with formaldehyde and other cross-linking agents.

Additional examples which are prepared by the method described above are summarized in the following table:

| Example | Polyester of | Allophanate diisocyanate | Chain lengthening agent | NCO-ratios | | Ethylene oxide content | Solid content | Properties of the film |
|---|---|---|---|---|---|---|---|---|
| | | | | NCO/OH | NCO/NH | | | |
| 2 | Adipic acid and ethylene glycol MW 2000 | A | hydrazine | 1.5 | 1.61 | 8.4% | 30% | firm, elastic film, Shore hardness 60 |
| 3 | Adipic acid | A | hydrazine | 1.8 | 1.38 | 9.5% | 30% | firm, elastic |

-continued

| Example | Polyester of | Allophanate diisocyanate | Chain lengthening agent | NCO-ratios NCO/OH | NCO/NH | Ethylene oxide content | Solid content | Properties of the film |
|---|---|---|---|---|---|---|---|---|
|  | and ethylene glycol MW 2000 |  | ethylene diamine molar ratio 1:2.22 |  |  |  |  | film, Shore hardness 55 |
| 4 | Adipic acid and ethylene glycol MW 2000 | A | hydrazine, ethylene diamine molar ratio 1:1.67 | 1.8 | 1.67 | 9.5% | 30% | firm, elastic film, Shore hardness 65 |

EXAMPLE 5

206 g of a polyester of adipic acid and ethylene glycol

Additional examples prepared by the method of Example 5 described above are summarized in the following table:

| Example | Polyester of | Allophanate diisocyanate | Chain-lengthening agent | NCO-ratios NCO/OH | CUZ,3-1/33 NCO/NH | Ethylene oxide content | Solids content | Properties of the film |
|---|---|---|---|---|---|---|---|---|
| 6 | Adipic acid, ethylene glycol MW 2060 | C | Propylene-1,2-diamine | 1.5 | 1.32 | 14.8% | 20% | firm, elastic film |
| 7 | Adipic acid, ethylene glycol MW 2060 | C | 4,4'-di-amino-di-cyclohexyl-methane | 1.5 | 2.1 | 14.7% | 20% | firm, elastic film |
| 8 | Adipic acid, ethylene glycol MW 2060 | C | ethylene diamine | 1.5 | 2 | 14.8% | 20% | firm film with little elasticity | having a molecular weight of 2060 are dehydrated under vacuum at 110°C for about 30 minutes. After cooling to 70°C, 74 g of allophanate diisocyanate mixture C are added and the reaction mixture is then heated to 110°C until (after about 1 hour) the NCO-content reaches or falls slightly below the calculated value of 1.5%. This prepolymer is dissolved in 800 ml of acetone. A chain-lengthening solution consisting of 2.3 g of propylene-1,2-diamine and 30 ml of water is added to the acetone solution at 50°C. The reaction mixture is left to react for 5 minutes at 50°C, during which time the viscosity of the mixture visibly rises. After termination of the reaction, 390 ml of water are stirred into the mixture and the acetone is distilled off under reduced pressure. A paste which has an NCO-OH-ratio of 1.5, an NCO-NH-ratio of 1.61 and an ethylene oxide content (based on solids content) of 14.8% is obtained. The solids content is 40.2%. This paste can be converted into a highly fluid, stable dispersion with a solids content of 10% by stirring 2120 ml of water into it.

On drying, the dispersion produces a soft, elastic film.

EXAMPLE 9

197 g of hexane-1,6-diol polycarbonate with a molecular weight of 1970 are dehydrated at 110°C for about 30 minutes under vacuum. After cooling to 70°C, a mixture of 40.2 of allophanate diisocyanate B and 11.8 g of hexamethylene diisocyanate are added and the reaction mixture is heated at 110°C until the NCO-content reaches or falls slightly below the calculated value of 2.36%. This prepolymer is dissolved in 800 ml of acetone. A solution of 10.5 g of 4,4'-diaminodicyclohexylmethane in 100 ml of 50% aqueous acetone is added to the acetone solution at 50°C and the mixture is left to react at 50°C for 5 minutes. After termination of the reaction, 800 ml of water are stirred in and the acetone is distilled off under reduced pressure. A dispersion which has an NCO/OH-ratio of 1.7, NCO/NH-ratio of 1.4 and ethylene oxide content (based on solids content) of 8.55% is obtained. The solids content of this stable dispersion is 30.5%. On drying, the dispersion gives rise to a film which has excellent strength.

The properties of additional dispersions which are prepared from hexane-1,6-diol polycarbonate are summarized in the table following.

| Example | Polyester of | Allophanate diisocyanate, Isocyanate | Chain-lengthening agent | NCO-ratios NCO/OH | NCO/NH | Ethylene oxide content | Solids content | Properties of the film |
|---|---|---|---|---|---|---|---|---|
| 10 | Hexane-1,6-diol MW 1970 | B Hexamethylene diisocyanate molar ratio 2:1 | Ethylene diamine | 1.5 | 1.37 | 8.65% | 25% | firm, elastic film |
| 11 | Hexane-1,6- | B | 4,4'-di- | 1.7 | 1.4 | 10.6% | 25% | firm, elastic |

-continued

| Example | Polyester of | Allophanate diisocyanate, Isocyanate | Chain-lengthening agent | NCO-ratios NCO/OH | NCO-ratios NCO/NH | Ethylene oxide content | Solids content | Properties of the film |
|---|---|---|---|---|---|---|---|---|
|  | diol MW 1970 | Hexamethylene diisocyanate molar ratio 3.25:1 | amino-di cyclohexyl-methane |  |  |  |  | film, Shore hardness 65 |
| 12 | Hexane-1,6-diol | B | 4,4'-di-amino-di-cyclohexyl-methane | 1.7 | 1.4 | 13.25% | 26% | firm, elastic film, Shore hardness 50 |

EXAMPLE 13

440 g of a polyester of adipic acid and butane -1,4-diol with a molecular weight of 2200 are dehydrated under vacuum (12 to 13 mm.Hg) at 110°C for about 30 minutes. After cooling to 70°C, 120.6 g of allophanate diisocyanate mixture B are added and the reaction mixture is then heated at 100° to 105°C until the NCO-content reaches or is slightly below the calculated value of 1.495%. This prepolymer is dissolved in 800 ml of acetone. A chain-lengthening solution consisting of 5 g of ethylene diamine and 50 ml of water is added to the acetone solution at 50°C. The reaction mixture is left to react at 50° to 55°C for 3 – 5 minutes, the viscosity visibly rising. After termination of the reaction, 800 ml of water are stirred into the mixture and the acetone is distilled off under reduced pressure. A dispersion which has an NCO/OH-ratio of 1.5, an NCO/NH-ratio of 1.20 and an ethylene oxide content of 11.4% is obtained. The solids content is approximately 39.5%. On drying, the dispersion produces a slight tendency to crystallization.

Additional examples of the preparation of non-ionic dispersions from a polyester of adipic acid and butane-diol are briefly tabulated as follows:

EXAMPLE 18

250 g of a polylactone (polycaprolactone, initiator ethylene glycol) with a molecular weight of 1250 are dehydrated under vacuum (12 to 13 mm.Hg) at 100° to 110°C for about 30 minutes. After cooling to 70°C, 57.6 g of allophanate diisocyanate are added and the reaction mixture is then heated to 100° to 105°C until the NCO-content reaches or falls slightly below the calculated value of 1.49%. This prepolymer is dissolved in 1.4 liters of acetone. A chain-lengthening solution consisting of 3.2 g of propylene-1,2-diamine and 30 ml of water is added to the acetone solution at 50°C. The reaction mixture is left to react at 50° to 55°C for 5 minutes, during which time the viscosity rises. After termination of the reaction, 530 ml of water are stirred in and the acetone is distilled off at reduced pressure. A dispersion wich has no NCO-OH-ratio of 1.5, NCO-NH-ratio of 2.43 and ethylene oxide content of 9.1% is obtained. The solids content is 33.7%. On drying, the dispersion produces a sticky film which can be cured with the usual cross-linking agents.

Additional examples for preparing non-ionic dispersions of polycaprolactone (using ethylene glycol as initiator) are summarized in the table following:

| Example | Polyester of | Allophanate diisocyanate | Chain-lengthening agent | NCO-ratios NCO/OH | NCO-ratios NCO/NH | Ethylene oxide content | Solids content | Properties of the film or dispersion |
|---|---|---|---|---|---|---|---|---|
| 14 | Adipic acid, butane-1,4-diol MW 2200 | B | propylene-1,2-diamine | 1.5 | 2.0 | 11.4% | 38% | firm, crystallizing film, Shore hardness 73 |
| 15 | Adipic acid, butane-1,4-diol MW 2200 | B | ethylene-diamine | 1.5 | 2.0 | 11.4% | 35% | firm, crystalline film, Shore hardness 72, thick liquid dispersion |
| 16 | Adipic acid, butane-1,4-diol MW 2200 | B | isophorone diamine | 1.5 | 2.0 | 11.3% | 42% | firm, crystalline elastic film |
| 17 | Adipic acid, butane-1,4-diol MW 2200 | B | 4,4'-di-amino-dicyclo-hexyl-methane | 1.5 | 2.5 | 11.3% | 41% | firm, crystalline film |

| Example | Polylactone of | Allophanate diisocyanate, diisocyanate | Chain-lengthening agent | NCO-ratios NCO/OH | NCO-ratios NCO/NH | Ethylene oxide content | Solids content | Properties of the film or dispersion |
|---|---|---|---|---|---|---|---|---|
| 19 | Caprolactone, starter ethylene glycol MW 1250 | B Hexamethylene diisocyanate molar ratio 1:1.4 | Ethylene diamine | 1.5 | 2 | 9.1% | 35% | elastic film, Shore hardness 42, particle size of dispersion of 210 mμ |

| Example | Polylactone of | Allophanate diisocyanate, diisocyanate | Chain-lengthening agent | NCO-ratios NCO/OH | NCO-ratios NCO/NH | Ethylene oxide content | Solids content | Properties of the film or dispersion |
|---|---|---|---|---|---|---|---|---|
| | | | -continued | | | | | |
| 20 | Caprolactone, starter ethylene glycol MW 1250 | B Hexamethylene diisocyanate molar ratio 1:1.14 | 4,4'-di-amino-di-cyclohexyl-methane | 1.5 | 2 | 8.9% | 30% | elastic film |

EXAMPLE 21

400 g of a linear polyether (starting material polypropylene oxide) with a molecular weight of 2000 are dehydrated under vacuum at 100° to 110°C for about 30 minutes. After cooling to 70°C, 81 g of allophanate diisocyanate mixture B and 16.8 g of hexamethylene diisocyanate are added to this polyether and the reaction mixture is then heated to 100°C until the NCO-content reaches of falls slightly below the calculated value of 1.69%. This prepolymer is dissolved in 1.4 liters of acetone. A chain-lengthening solution consisting of 5 g of propylene-1,2-diamine and 30 ml of water is added to the acetone solution at 50°C and the mixture is left to react in the usual manner. A thin liquid dispersion which has an NCO/OH-ratio of 1.5, an NCO/NH-ratio of 1.47, an ethylene oxide content of 8.55%, particle sizes of 110 to 130 m $\mu$ and a solids content of 37.2% is obtained by stirring 820 ml of water into the mixture and distilling off the acetone under vacuum.

On drying, the dispersion produces a soft film which can be cured with the usual cross-linking agents.

EXAMPLE 22

167 g of a polyester of adipic acid and hexane-1,6-diol with a molecular weight of 835 are dehydrated under vacuum at 100° to 110°C for about 30 minutes. After cooling to 70°C and adding 40 g of allophanate diisocyanate mixture B and 34 g of hexamethylene diisocyanate, the reaction mixture is heated to 100°C until its NCO-content reaches or falls below the calculated value. A chain-lengthening solution consisting of 10.5 g of 4,4'-diamino-dicyclohexylmethane, 50 ml of acetone and 30 ml of water is added to the acetone prepolymer solution (1.2 liters of acetone) at 50°C. After the mixture has been left to react (5 minutes, 50°C), 520 ml of water are stirred in and the acetone is evaporated off under vacuum. The resulting highly fluid dispersion has an NCO/OH-ratio of 1.5, an NCO/NH-ratio of 2, an ethylene oxide content of 8.5% and a solids content of 31.3%.

On drying, the dispersion produces an elastic film with Shore hardness 55.

EXAMPLE 23

167 g of a dehydrated polyester of adipic acid and hexanediol are reacted with 53.3 g of allophanate diisocyanate mixture B and 28 g of hexamethylene diisocyanate as described in Example 22. 4.8 g of propylene diamine and 30 ml of water are added to the acetone solution of the prepolymer (1.2 liters of acetone) and the mixture is left to react under the usual conditions. 530 ml of water are stirred in and the acetone is completely removed under vacuum. The resulting dispersion has an NCO/OH-ratio of 1.5, NCO/NH-ratio of 1.54, ethylene oxide content of 11.2% (based on solids content), particle size of 150 m $\mu$ and a solids content of 31%.

On drying, an elastic film with Shore hardness 55 is obtained.

EXAMPLE 24

440 g of a polyester of adipic acid and hexane-1,6-diol with a molecular weight of 2200 is dehydrated under vacuum at 100° to 110°C for about 30 minutes. 96 g of allophanate diisocyanate mixture B and 10.1 g of hexamethylene diisocyanate are added at about 70°C and the mixture is then heated until the NCO-content reaches or falls just below the calculated value (1.54%). 13.2 g of 4,4'-diaminodicyclohexylmethane in 50 ml of acetone and 30 ml of water are added to the acetone prepolymer solution (1.4 liters of acetone) and the mixture is left to react in the usual manner. After stirring 850 ml of water into the mixture and removing the acetone under vacuum, a dispersion with a bluish shimmer is obtained. It has an NCO/OH-ratio of 1.5, NCO/NH-ratio of 1.59, ethylene oxide content of 9.25% and a solids content of 39%.

On drying the dispersion, a very firm, elastic film is obtained.

EXAMPLE 25

440 g of a polyester of adipic acid and hexane-1,6-diol with a molecular weight of 2200 are dehydrated (100° to 110°C, 30 minutes) and then heated to 100°C with 104 g of biuret diisocyanate (F) and 10.1 g of hexamethylene diisocyanate until the NCO-content reaches or falls just below the calculated value of 1.52%. 13.2 g of 4,4'-diaminodicyclohexylmethane (dissolved in 50 ml of acetone and 30 ml of water) are added to the acetone prepolymer solution (1.4 liters of acetone) and the mixture is left to react in the usual manner. After stirring 1000 ml of water into the mixture and removing the acetone under vacuum, a dispersion which has an NCO/OH-ratio of 1.5, NCO/NH-ratio of 1.59, ethylene oxide content of 9.4% and solids content of 35.5% is obtained.

A firm, elastic film is obtained on drying the dispersion.

EXAMPLE 26

The procedure is the same as in Example 25, but 4.65 g of propylene-1,2-diamine in 30 ml of water are used. After stirring 1000 ml of water into the mixture and removing the acetone under vacuum, a thin liquid dispersion is obtained which has an NCO/OH-ratio of 1.5, NCO/NH-ratio of 1.59, ethylene oxide content of 9.45% and solids content of approximately 35%.

A firm, elastic film is obtained upon drying the dispersion.

EXAMPLE 27

149 g of allophanate diisocyanate D are added at 70°C to 425 g of hexanediol polycarbonate (dehydrated) which has a molecular weight of 1940 and the reaction mixture is heated to 100°C for 2 hours (NCO = 3.61%), cooled to 65°C and dissolved in 574 g of acetone. A 50% solution of the prepolymer in acetone is obtained (NCO = 1.73%). 36.5 g of 3-aminomethyl-3,5,5-trimethyl-cyclohexylamine in 200 g of acetone are added to 514 g of this solution at room temperature and 500 g of water are added after 30 seconds with rapid stirring. A bluish translucent polyurethane dispersion which contains acetone is obtained. After removal of the acetone solvent by distillation at approximately 150 mm.Hg, 770 g of a finely divided non-ionic polyurethane dispersion with a solids content of 38% is obtained. Its viscosity measured in a Ford cup (nozzle 4) is 20 seconds and a film cast from this dispersion produces a clear, elastic, glossy and tack-free coating on drying. The polyethylene oxide content based on solid polyurethane is 9.8%.

Examples 28 to 37 are summarized in the following table. The procedure is the same as described in Example 27, using in each case 425 g of the given polycarbonate diol.

| Serial No. | Hexanediol polycarbonate | Allophanate diisocyanate | NCO [%] | 50% solution [g] | Diamine | | Ethylene oxide content | Solids content [%] | Ford cup viscosity [nozzle 4] | Tensile strength/ elongation break |
|---|---|---|---|---|---|---|---|---|---|---|
| 28 | Mol. w. 1040 | D, 150 g | 1.76 | 1116 | a | 33.0 g | 9.7% | 39 | 18.1 sec | 141/405 |
| 29 | '' | D, 147 g | 1.63 | 330 | a | 6.9 g | 10.7% | 38 | 17.0 '' | 121/360 |
| 30 | '' | D, 147 g | 1.63 | 300 | a | 7.8 g | 10.6% | 37 | 23.0 '' | 140/670 |
| 31 | '' | D, 147 g | 1.63 | 300 | b | 11.9 g | 10.3% | 39 | 13.0 '' | 133/340 |
| 32 | '' | D, 147 g | 1.63 | 300 | b | 15.9 g | 10.1% | 38 | 13.0 '' | 119/280 |
| 33 | '' | D, 92 g | 0.54 | 1034 | b | 17.9 g | 7.5% | 39 | 13.1 '' | 118/650 |
| 34 | '' | D, 92 g | 0.54 | 1034 | a | 8.3 g | 7.6% | 38 | 14.0 '' | 136/600 |
| 35 | Mol. w. 990 | D*,100 g | 1.06 | 705 | b | 12.7 g | 7.5% | 43 | 19.0 '' | 227/470 |
| 36 | '' | D**100 g | 0.77 | 680 | c | 9.3 g | 7.7% | 40 | pasty | 330/570 |
| 37 | '' | E, 156 g | 0.49 | 1162 | d | 12.6 g | 8.6% | 39 | 21.4 '' | 245/615 |

Diamines:
a propylene-1,2-diamine
b 3-aminomethyl-3,5,5-trimethyl cyclohexylamine
c adipic acid bis-hydrazide
d 4,4'-diaminodicyclohexylmethane
*51 g of hexamethylene diisocyanate in addition
**42 g of hexamethylene diisocyanate in addition Any other difunctional organic compound having groups containing reactive hydrogen atoms determinable by the Zerewitinoff method and a molecular weight of about 500 to about 6000, any other organic diisocyanate of the above formula I or mixture thereof with other diisocyanate and any other chain extender indicated as suitable herein may be used in the foregoing examples. Likewise, the various components disclosed as suitable for making polyurethanes and polyurethane-ureas disclosed by Saunders and Frisch in the book "Polyurethanes: Chemistry and Technology" published by Interscience Publishers, Copyright 1962, the disclosure of which is incorporated herein by reference, may be used.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In the preparation of a polyurethane latex by a process wherein a difunctional organic compound having reactive hydrogen atoms and an organic diisocyanate are reacted together and the resulting polyurethane is dispersed in water, the improvement which comprises reacting the said compound having reactive hydrogens with an organic diisocyanate having a molecular structure which contains an allophanate or biuret group attaching a side chain having repeating $-\!\!+\!\mathrm{O-CH_2-CH_2}\!+\!\!-$ groups thereto.

2. The process of claim 1 wherein the said allophanate or biuret diisocyanate is mixed with an organic diisocyanate free from $-\!\!+\!\mathrm{O-CH_2CH_2}\!+\!\!-$ groups and the mixture contains at least 5 mol percent of the allophanate or biuret diisocyanate.

3. The process of claim 2 wherein the said mixture contains 10 to 50 mol percent allophanate or biuret diisocyanate.

4. A process for making non-ionic aqueous polyurethane dispersions which are free from emulsifiers which comprises reacting an organic compound having a molecular weight of from about 500 to about 6000 which is difunctional for the purpose of an isocyanato polyaddition reaction and contains terminal hydrogen atoms which are reactive towards isocyanate groups with organic diisocyanates which contain from about 5 to about 100 mol percent of a diisocyanate having polyethlene oxide units and the general formula

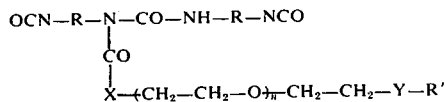

in which
R represents an organic group obtained by removal of the isocyanate groups from an organic diisocyanate having a molecular weight of from about 112 to about 1000,
R' represents a monovalent hydrocarbon group containing 1 to 10 carbon atoms,
X and Y are identical or different and represent oxygen or a group of the formula —N(R'') - in which R'' represents a monovalent hydrocarbon group containing 1 to 12 carbon atoms, and n represents an integer of from 9 to 89, and dispersing the resultant product in water.

5. Polyurethane dispersions prepared from the process of claim 4.

6. The process of claim 4 wherein the reaction product of the organic diisocyanate and the said organic compound having a molecular weight between about 500 and about 6000 is chain extended with an organic compound having reactive hydrogen atoms and a molecular weight below 500.

7. The process of claim 4 wherein the organic diisocyanate is a mixture of one having the said formula and an organic diisocyanate free from side chains containing ethylene oxide.

* * * * *